United States Patent [19]

Khudenko

[11] Patent Number: 4,482,510

[45] Date of Patent: Nov. 13, 1984

[54] SELF-PROPELLED JET AERATOR

[75] Inventor: Boris M. Khudenko, Southfield, Mich.

[73] Assignee: Georgia Tech Research Institute, Atlanta, Ga.

[21] Appl. No.: 212,881

[22] Filed: Dec. 4, 1980

[51] Int. Cl.³ .............................................. C02F 7/00
[52] U.S. Cl. .................... 261/91; 210/242.2; 261/120
[58] Field of Search .............. 210/219, 242.2; 261/91, 261/120

[56] References Cited

U.S. PATENT DOCUMENTS 3,620,512 11/1971 Muskat et al. .................... 261/120

FOREIGN PATENT DOCUMENTS 726027 4/1980 U.S.S.R. .......................... 210/242.2

OTHER PUBLICATIONS

Khudenko, "Self-Propelled Aerators for Lagoons", Proceedings of the U.S. Department of Energy, Energy Optimization of Water and Wastewater Management for Municipal and Industrial Applications Conference, Dec. 10–13, 1979, New Orleans, LA, vol. 2.

Certificate of Invention, No. 309, 908, USSR, Apr. 20, 1970.

Primary Examiner—Ivars C. Cintins

[57] ABSTRACT

A self-propelled aeration device comprising a jet-aerator mounted on floats and connected by a hinged arm to a central pile for enabling the said aerator to rotate around the pile thus mixing and aerating both the large surface and great depth of a reservoir. As the jet-aerator a weir or orifice, preferably tooth-shaped orifice, are employed. In order to reduce the obstruction of jets and the wind resistance most of the elements of the floating structure are combined in a central box. The said box is self-supporting on water so that only small balancing floats are needed in addition to the central box in order to provide the stability of the floating structure. The device has provisions for preventing icing and clogging.

6 Claims, 5 Drawing Figures

SELF-PROPELLED JET AERATOR

FIELD OF INVENTION

This invention relates to devices for mass transfer in systems Gas-Liquid and specifically to improved self-propelled aerators for dissolving oxygen and other gases in and for stripping ammonia, hydrogen sulfide, volatile organics and other volatile products from water and wastewater.

PRIOR ART

For many processes, for example, for water aeration in the low rate biological processes such as biological ponds and lagoons, polishing ponds, extended aeration activated sludge process, oxidation ditches and modifications of these processes, self-propelled aerators demonstrate better performance than conventional stationary aerators and provide significant monetary and energy savings.

Self-propelled aerators are described in the article "Self-propelled Aerators for Lagoons," by Boris Khudenko, Proceedings of the U.S. Department of Energy, Energy Optimization of Water and Wastewater Management for Municipal and Industrial Applications Conference, Dec. 10–13, 1979, New Orleans, La., Vol. 2, pp. 471–480, and in the Certificate of Invention No. 309908 issued to B. M. Khudenko, E. A. Shpirt and V. G. Ocsijanikov by the Soviet Committee on Inventions and Discoveries, Priority Date: Apr. 20, 1970; Registered on May 3, 1971.

Self-propelled aerators consist of the following major elements: a floating structure which includes an aeration means mounted on pontoons, a central pile, and a hinged arm connecting the floating structure and the central pile. When the aerator is driven by a motor it produces a propelling force which causes the floating structure to rotate around the central pile. Propelling force in these aerators is produced either due to the imbalanced torque, for example for an open bladed turbine type aerator or for brush aerator, or by the employment of deflection plates and other devices producing water jets in the direction opposite to the direction of deflected jets, for example, for diffused air aerators or aerators with closed turbines. While moving on the water surface in a reservoir self-propelled aerators mix water in the reservoir and provide the transfer of gas from the atmosphere into the water or vice versa. Because these aerators are mobile they are capable of mixing approximately a four-fold larger volume of water than stationary units of the same nominal power.

Of presently known, mechanical self-propelled aerators are the best. However, they have several disadvantages:

When the length of the hinged arm is increased to service a larger area, the propelling force is decreased causing lower velocity of the movement of the aerator in the reservoir. Under windy conditions, this may cause complete stalling of the device.

Maximal velocities of flows procuded by mechanical aerators occur in a thin top layer in the reservoir. These conditions are not adequate for resuspending the solids deposited at the bottom of the reservoir.

Pontoons which are used for supporting aerators obstruct flows of water thus reducing aeration efficiency and mixing capacity of the device.

Open bladed turbine type aerators are driven by a motor-gear assembly which is usually heavy. This requires a heavy supporting structure and large pontoons thus increasing the size of the entire device and its cost. The large size of the device also increases the hydraulic and wind resistance.

Other types of self-propelled aerators are either too complex (for example, diffused air aerators or closed turbine aerators which require jet deflection devices), or produce too low amount of mixing (for example, diffused air and closed turbine aerators are not capable of effectively mixing water in large reservoirs due to constrictions of flows by deflection devices, the brush type aerator produces low bottom velocities of flow), or provide too low efficiency of gas transfer (for example, brush aerators and the coarse bubble diffused air aerators).

Self-propelled aerators of present design have large surface of pontoons and supporting structure exposed to the atmosphere. In cold regions, snow and ice are accumulated on this surface. This adds to the weight of the structure causing the submergence of these aerators to increase beyond the optimal range. Subsequently the efficiency of aeration and the mixing capacity of these devices are lowered.

Presently known self-propelled aerators do not have any devices for the protection from clogging by thread-like suspended material, for example, by the remnants of water plants. This causes operational problems and lowers the aeration efficiency and mixing capacity of these devices.

OBJECTS

Accordingly, it is the primary aim of the present invention to provide a self-propelled aeration device which combines high efficiency of mass transfer with high mixing capacity, specifically, higher bottom velocities of flow.

It is another object of the present invention to provide a self-propelled aeration device which produces a propelling force and velocity of movement which are not dependent on the length of the hinged arm connecting the floating structure with the central pile.

It is a further object of the present invention to provide a self-propelled aeration device wherein pontoons and floats do not obstruct the water flows and do not reduce the aeration efficiency and the mixing capacity of the device.

It is further an object of the present invention to provide a self-propelled aeration device which aeration efficiency and mixing capacity are not lowered under the cold winter operation conditions.

It is also an object of the present invention to provide a self-propelled aeration device which is simple to produce and manufacture.

Other objects and advantages of the invention will become apparent upon reading the following detailed description and upon reference to the drawings.

While the invention will be described in connection with a preferred embodiment, it will be understood that I do not intend to limit my invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Figure 1:
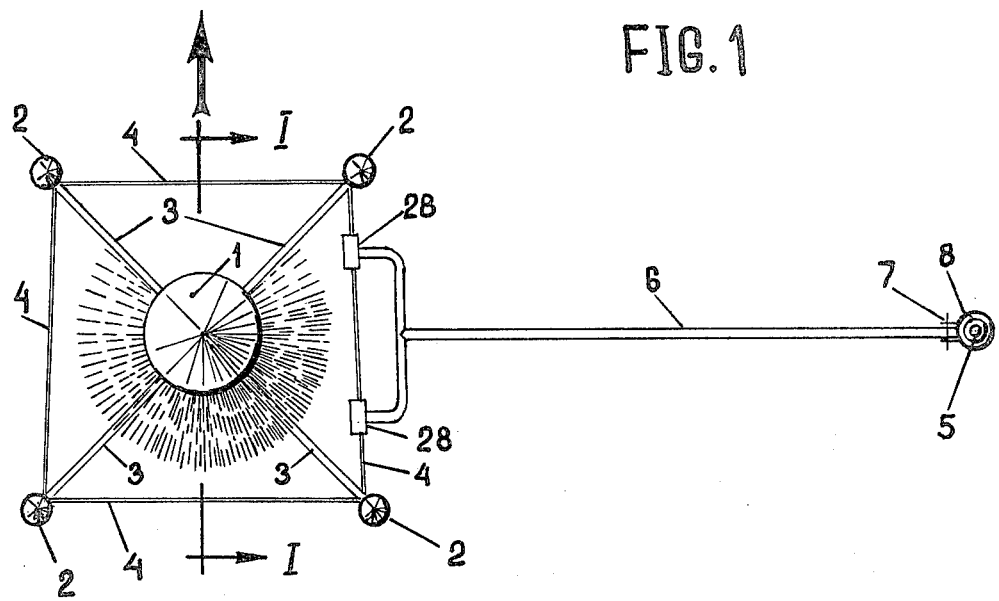
FIG. 1 is a top view of self-propelled jet aerator.
Figure 2:
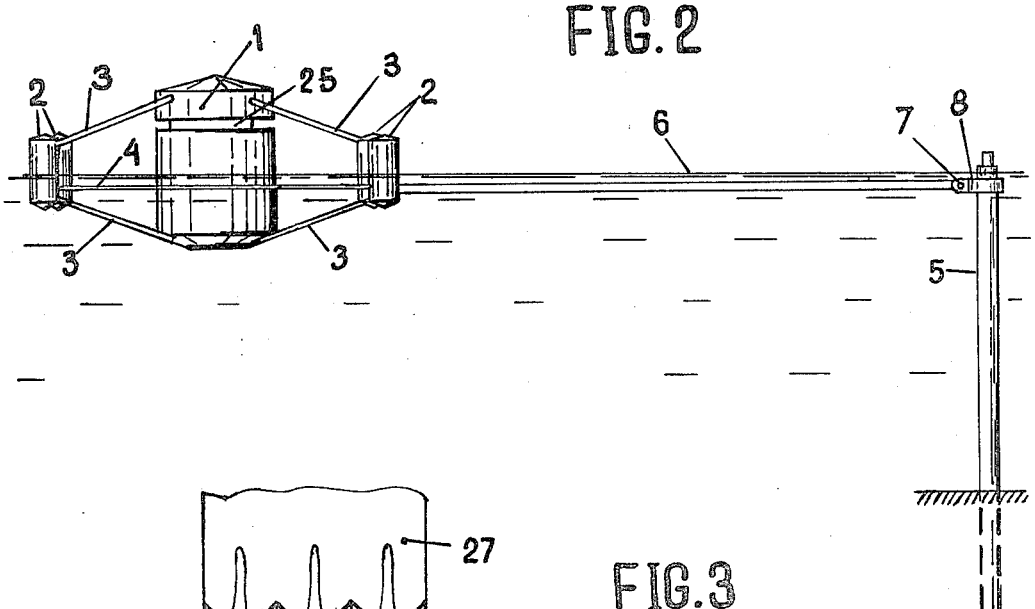
FIG. 2 is a front view of self-propelled jet aerator.

Referring now to FIGS. 1 and 2, there is shown a self-propelled jet aerator consisting of the central box 1 connected with balancing floats 2 by pairs of braces 3. Floats are interconnected by the cable 4. These elements comprise the floating structure.

The floating structure is connected to the central pile 5 by means of the arm 6, the hinge 7, the bearing 8, and clamps 28, connecting the arm 6 with the cable 4.

Figure 4:
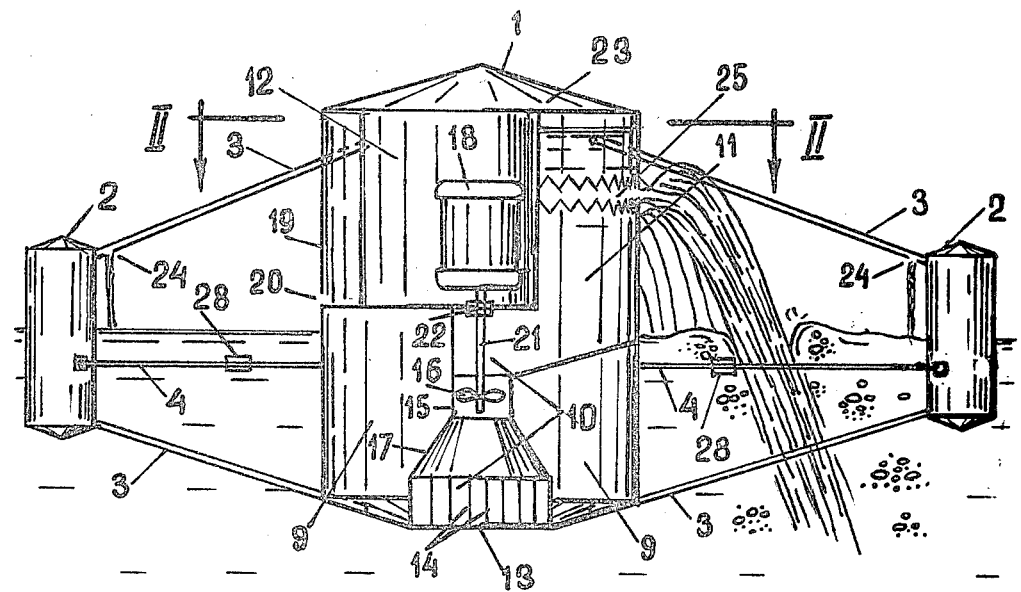
FIG. 4 is a view in detail of the portion indicated by section lines I—I in FIG. 1.
Figure 5:
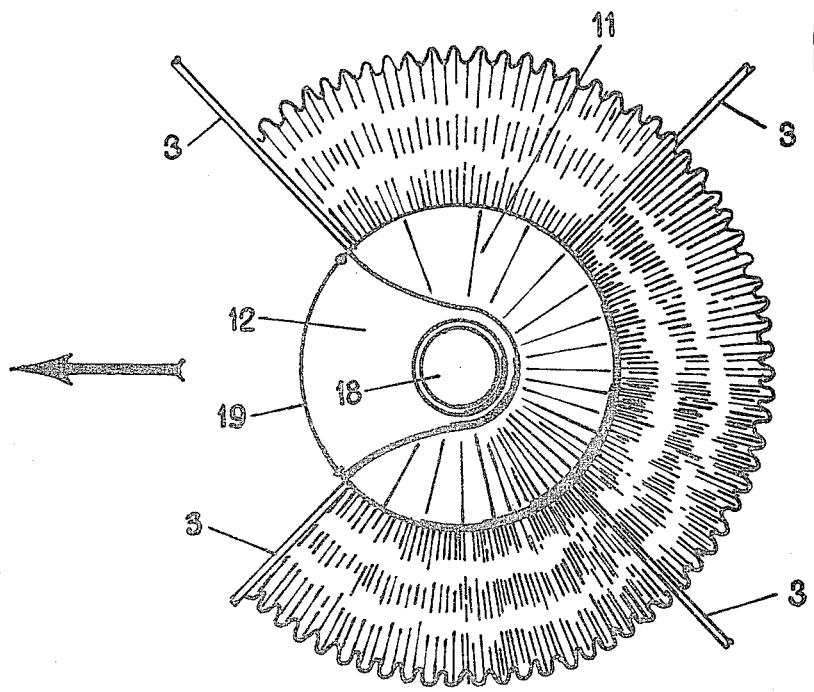
FIG. 5 is a view of the portion indicated by section lines II—II in FIG. 4.

Referring now to FIGS. 4 and 5, the central box consists of the pontoon section 9 with built-in pump well 10, the weir section 11, embracing the motor section 12 from the front and sides. The pump well and the weir section are connected by a water passage located between the top of the pump well and the bottom of the weir section. The motor section is separated from the weir and pontoon sections, and from the pump well.

The size and the shape of the pontoon section and floats are selected such that (a) the sum of vectors of the buoyance force and the vertical component of all static and dynamic forces applied to the floating structure equals zero, (b) the sum of moments of all static and dynamic forces applied to the floating structure equals zero, (c) when conditions a and b are satisfied, the position of the weir 13 is horizontal.

The pump well consists of the girder box 13 with vertical flat plates 14, and the neck section 15 where the pump rotor 16 is located. The neck section and the girder block are connected by a reducer 17.

The motor section houses the pump 18 and is provided with the entrance lead 19 and the drainage orifice 20. The motor and the pump rotor are connected by the shaft 21 supported by the water tight bearing 22. The motor is fastened to the plate which is tightly bolted or clamped to the bottom of the motor section. Bearing 22 is fixed in this plate. A cylindrical skirt with outside diameter equal to the inside diameter of the neck section 15 is attached to this plate from beneath. This skirt has the opening which coincides with the passage between the pump well 10 and the weir section 11. The motor and the weir sections are covered with the top lead 23.

The lower braces 3, the cable 4, and the arm 6 are located below the water level in reservoir. The upper braces 3 are made of pipes with the open top protruding into the weir section at the level above the weir (or orifice) and below the water level in the weir section. At the lower end, these braces have orifices 24.

Floats 2 are located beyond the jet trajectories.

The bearing 5 permits free rotation of the floating structure and the arm around the central pile.

The hinge 7 and the flexibility of the cable 4 permit the keel and board heeling of the floating structure, and the lowering of the structure to the bottom of the reservoir when it is emptied.

Referring now to FIG. 5, there is the front view and the section of the preferred shape of the orifice 25 for the self-propelled jet aerator. The orifice is formed by the tooth-shaped weir 26 and the tooth shaped shield 27 located over the weir. The orifice is made in the outer wall of the weir section and stretches along the entire length of this wall, or is broken into several sections along the perimeter of the weir section.

OPERATION OF THE DEVICE

Figure 3:
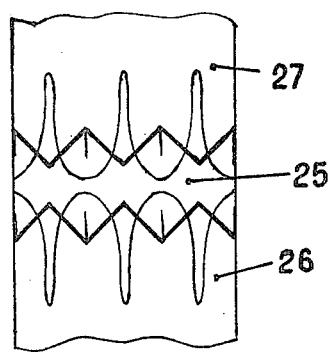
FIG. 3 is a front view of a fragment of a weir (orifice) showing the shape of the orifice for the preferred embodiment: tooth-shaped orifice, and the cross section of the jet (lighter line).

Referring now to FIGS. 1, 2 and 3 and the preferred embodiment described above, the device would be operated as follows:

The pump rotor 16 driven by the motor 18 would take water from the reservoir and lift it in the weir section 11, from where water would be discharged through the orifice 25. Discharged water would form jets around the front and side parts of the central box 1.

Water jets entering the reservoir would entrain air from the atmosphere, break it into bubbles, and involve these bubbles into the thickness of the water in reservoir. Beyond the zone of aeration the bubbles would float up and leave the water. This would provide excellent conditions for mass transfer of oxygen from the air or stripping of volatile components from the water. At the same time, water jets would mix the content of the reservoir providing greater rates of chemical, physicochemical and biological processes and preventing the settling of suspended solids in the reservoir.

Because the orifice 25 is located only at the front and side walls of the central box 1, the water jets would generate the propelling force directed as shown by the arrow in FIG. 1. This force would cause the floating structure to rotate around the central pile 5. The propelling force for such aerator and the velocity of movement of the floating structure would not depend on the arm length. The rotating unit would be capable of mixing and aerating as large a volume of water in reservoir as that mixed and aerated by four stationary units, each consuming the same amount of energy. This would allow one to save on energy and capital and operational costs.

The employment of the tooth-shaped orifice 25 would provide high efficiency of mass transfer processes due to the inversion of the jet shape. In the transverse section the shape of the jet coming out of the tooth-shaped orifice would look like a two-sided comb with wider section located against the tooths in the orifice. Air located in spaces between wider parts of the jet would be entrapped and carried downward into the water in the reservoir. This would provide high efficiency of gas transfer in absorption and desorption processes.

The employment of an orifice type discharge outlet provides a greater horizontal component of the velocity of jets at the orifice then that for the same flow across an open weir or from a nozzle, because the jet is contracted in the orifice. This provides greater propelling force.

The free falling jet would enter the water at a relatively steep angle and penetrate to the bottom of the pond, be reflected from the bottom in the direction from the aerator and upward, and gradually dissipate. This would provide a favorable distribution of velocity of flow in the reservoir such that velocities in the near-the-bottom zone of the reservoir would be comparatively high.

A low head high capacity pumps with the propeller type rotor would be used in the present aeration device. This kind of pump produces high discharge rate which would be more adequate for mixing large volumes of water than high head low capacity pumps.

Said above in this section shows that the present invention includes elements for providing high propelling force and the velocity of movement, high efficiency of gas transfer, and high mixing capacity, specifically, higher bottom velocities of flow.

The bulk of the weight is supported by the pontoon section 9. The floats 2 are needed only for providing the stability of the floating structure. Because of that these floats and braces 3 and the cable 4 are small and light. The floats and the cable are located beyond the trajectories of jets. Only lower braces 3 slightly obstruct the jets. For such conditions, neither gas transfer efficiency, nor mixing capacity of the device are reduced. This also provides low hydraulic and wind resistance.

In the process of operation of the device (a) the heat emitted by the motor 18 would warm the motor compartment 12 and prevent icing of the central box 1, (b) water from the weir section 11 would constantly flow through upper braces 3 and prevent their icing. The floats 2 would have the temperature close to that of water in the reservoir. The rest of the structure is located under the water and would not be subjected to icing. This shows that the present invention includes elements which would permit the winter operation without lowering the aeration efficiency and/or mixing capacity of the aerator.

Water from the reservoir would enter the pump well 10 through the girder box 13 with the girder formed by a comparatively high plates 14. The velocity of flow entering the girder box would be low. This would prevent large floating pieces from entering the pump well. Lighter and smaller suspended particles would not pose operational problems. The thread-like material would be caught by the plates 14. Periodically, the motor would be stopped and the girder would be washed by back flow of water from the weir compartment thus cleaning the girder. If sandy and like particles are accumulated at the bottom of the weir zone, they would also be washed out.

If a leakage in the bearing 22 occurs, the water would be drained from the motor compartment through the orifice 20.

The present invention does not include any complex devices, unusual materials, etc. It is simple to manufacture and install. It can be transported by usual means and easily assembled at the construction side. The pump-motor assembly fastened to the plate and skirt can be easily unbolted from the device and removed for service and repair.

Principal elements of the device have been tested. Detailed data on design of this device is presented in the article mentioned in the section "Prior Art."

While the above description contains many specificities, this should not be construed as limitations on the scope of the invention, but rather as an exemplification of one preferred embodiment thereof. Many other variations are possible, for example, shape of the central box, shape and number of floats, system of braces and hinges can vary, various types of weirs or ofifices or their combinations can be employed. Various pump and motor assemblies, as submersible motors, airlifts, can be incorporated in the device.

I claim:

1. A self-propelled device for aeration and mixing of a deep and wide body of water comprising in combination:

a floating structure supported by pontoons on the water;

said floating structure including a water compartment supported by the said pontoons;

orifice means located in the outer wall of the said water compartment for discharging water jets in the direction opposite to the direction of the rotation of the said pontoon structure and also in sideways directions;

means for pumping water from the said water body into the said water compartment so as to supply water to said orifice means;

said means for pumping water comprising a motor and a pump;

guide means secured to the said pontoon structure to guide said floating structure in a helical path.

2. A self-propelled aeration device, as recited in claim 1, wherein said orifice means comprises a tooth-shaped orifice in said outer wall.

3. A self-propelled aeration device, as recited in claim 1 wherein the floating structure consists of two or more small balancing floats located around a central box comprised of:

a central pontoon section capable of supporting on water the entire weight of the floating structure;

a pump well in the central pontoon structure communicating said body of water with said water compartment and housing said pump;

a motor well housing said motor;

said water compartment embracing the said motor and pump wells.

4. A self-propelled aeration device, as recited in claim 3 said motor and said pump are assembled on a plate and a skirt support which are secured to the bottom of the said motor section, said skirt support fitting tightly in the said pump well section and having an opening defining a water passage between the pump well and the water compartment.

5. A self-propelled aeration device, as recited in claim 3, including braces connecting the central box with said small floats, said braces and said guide means being submerged below the water level, and further braces exposed to the air above the water level, said further braces extending between said water compartment and said small floats, said further braces being in communication with said water compartment and having discharge orifices adjacent said small floats so as to provide a continuous flow of water from the water compartment through the said further braces.

6. A self-propelled aeration device, as recited in claim 3, comprising a plurality of high vertical plates located at the entrance port of the said pump well for screening large floating pieces.

* * * * *